United States Patent [19]

Fernholtz et al.

[11] E Patent Number: Re. 32,763

[45] Reissued Date of Patent: Oct. 11, 1988

[54] CAST DETERGENT-CONTAINING ARTICLE AND METHOD OF MAKING AND USING

[75] Inventors: Peter J. Fernholtz; James L. Copeland, both of Burnsville; Richard C. Penttila, East Bethel, all of Minn.

[73] Assignee: Ecolab Inc., St. Paul, Minn.

[21] Appl. No.: 901,249

[22] Filed: Aug. 27, 1986

Related U.S. Patent Documents

Reissue of:

[64] Patent No.: 4,569,780
Issued: Feb. 11, 1986
Appl. No.: 509,916
Filed: Jul. 1, 1983

U.S. Applications:

[60] Division of Ser. No. 234,940, Feb. 17, 1981, which is a continuation-in-part of Ser. No. 123,956, Feb. 25, 1980, abandoned, which is a continuation-in-part of Ser. No. 875,784, Feb. 7, 1978, abandoned.

[51] Int. Cl.[4] ..... B08B 3/04; C11D 7/06; C11D 11/00; C11D 17/04

[52] U.S. Cl. ..... 252/90; 134/25.1; 134/29; 134/36; 134/57 D; 137/268; 206/524.5; 239/31 D; 252/99; 252/103; 252/135; 252/156; 252/174; 252/174.24; 252/DIG. 16; 422/261; 422/263; 422/264; 422/278

[58] Field of Search ..... 134/36, 25.1, 29, 57 D; 252/90, 92, 93, 99, 103, 134, 135, 156, 174, DIG.16; 137/268; 206/524.5; 239/310; 422/261, 263, 264, 278

[56] References Cited

U.S. PATENT DOCUMENTS 404,354 5/1889 Huber ..... 422/266
871,612 11/1907 Nesfield ..... 424/15
1,325,361 12/1919 Harshberger ..... 252/93

(List continued on next page.)

FOREIGN PATENT DOCUMENTS 715310 1/1967 Canada .
0003769 9/1979 European Pat. Off. .
687075 2/1953 United Kingdom .

OTHER PUBLICATIONS

Fuchs, Polkowski, Cargano, "Agglomerated Automatic Dishwasher Detergents", *Chemical Times and Trends,* pp. 37–42 (Oct. 1977).

"WARHEAD-Chlorinated Brick Detergents", Model C-14, Warhead Brick Dispenser.

"KLENZADE Detergent Bricks", Formulas KDB-3 and KDB-4 (1958).

"Ecolab-Detergent Concentrated Tank for Use with the Solu-Matic Z4 and Powdered Detergents", Model C-8.

"Ecolab Detergent Concentrated Tank for Use with the Solu-Matic Z4 and Powdered Detergents", Model C-33.

"Ecolab Detergent Control and Application Equipment", Models C-11 and C-15.

"Ecolab Detergent Control and Application Equipment", Model C-11.

"Ecolab Detergent Control and Application Equipment", Model C-4.

*Primary Examiner*—Dennis Albrecht
*Attorney, Agent, or Firm*—Merchant, Gould, Smith, Edell, Welter & Schmidt

[57] ABSTRACT

Solid cast detergent-containing articles are produced for use in automatic washing machines. A liquid detergent composition is cast into a mold where it is allowed to solidify. The solid cast detergent, surrounded on all but its upper surface by the mold, is used in automatic washing machines having a dispensing device designed to dispense a liquid aqueous detergent formed from the solid cast detergent using an impinging liquid spray. The liquid aqueous detergent flows out of the dispensing device generally simultaneously with its formation in the dispenser. The cast detergent composition includes an alkaline hydratable chemical and optionally further includes one or more preformed cores or plugs comprising an available chlorine source, a defoamer, or the like.

26 Claims, 2 Drawing Sheets

OTHER PUBLICATIONS

| | | | |
|---|---|---|---|
| 1,380,388 | 6/1921 | Kaufman | 252/93 |
| 1,580,576 | 4/1926 | Weidner | 252/DIG. 16 |
| 1,949,264 | 2/1934 | Bagley | 87/5 |
| 2,031,853 | 2/1936 | Potts | 226/93 |
| 2,083,076 | 6/1937 | Mau | 252/194 |
| 2,120,807 | 6/1938 | Kundel | 239/312 |
| 2,138,943 | 12/1938 | Sinkwich | 206/0.5 |
| 2,164,092 | 6/1939 | Smith | 423/308 |
| 2,238,969 | 4/1941 | Butterfield | 137/268 |
| 2,308,612 | 1/1943 | Lehmkuhl | 422/274 |
| 2,333,443 | 11/1943 | Robinson | 252/135 |
| 2,339,396 | 1/1944 | Harvey | 422/261 |
| 2,370,609 | 2/1945 | Wilson | 324/448 |
| 2,371,720 | 3/1945 | Stine | 299/83 |
| 2,382,163 | 8/1945 | MacMahon | 252/138 |
| 2,382,164 | 8/1945 | MacMahon | 252/138 |
| 2,382,165 | 8/1945 | MacMahon | 252/135 |
| 2,387,945 | 10/1945 | McDow | 422/266 |
| 2,412,819 | 12/1946 | MacMahon | 252/138 |
| 2,477,998 | 8/1949 | McCowan | 299/83 |
| 2,604,386 | 7/1952 | Arant | 252/173 |
| 2,613,922 | 10/1952 | Gatchet | 366/151 |
| 2,641,506 | 6/1953 | Lowthers | 299/83 |
| 2,646,189 | 7/1953 | Wickesberg | 222/36 |
| 2,686,080 | 8/1954 | Wood | 299/83 |
| 2,698,022 | 12/1954 | Fahnoe | 137/79 |
| 2,738,323 | 3/1956 | Tepas, Jr. | 210/28 |
| 2,788,328 | 4/1957 | Merget | 252/135 |
| 2,802,724 | 8/1957 | Johnson | 422/265 |
| 2,804,432 | 8/1957 | Bonewitz et al. | 252/156 |
| 2,820,701 | 1/1953 | Leslie | 422/279 |
| 2,920,417 | 1/1960 | Wertheimer | 45/28 |
| 2,987,483 | 6/1961 | Brooker | 252/138 |
| 3,048,548 | 8/1962 | Martin et al. | 252/135 |
| 3,070,316 | 12/1962 | Milville | 239/312 |
| 3,092,515 | 6/1963 | Pike | 134/25.5 |
| 3,156,536 | 11/1964 | Desbois | 422/209 |
| 3,166,512 | 1/1965 | Mizuno et al. | 252/99 |
| 3,166,513 | 1/1965 | Mizuno et al. | 252/99 |
| 3,174,934 | 3/1965 | Shen | 252/135 |
| 3,178,067 | 4/1965 | Bell | 222/146.5 |
| 3,253,741 | 5/1966 | Russell | 222/52 |
| 3,271,317 | 9/1966 | Otrhalek et al. | 252/135 |
| 3,272,899 | 9/1966 | Diamond | 264/126 |
| 3,273,586 | 9/1966 | Killmeyer | 137/268 |
| 3,279,995 | 10/1966 | Reid | 424/467 |
| 3,291,576 | 12/1966 | Otrhalek | 23/302 |
| 3,306,858 | 2/1967 | Oberle | 252/99 |
| 3,307,744 | 3/1967 | Burford | 222/1 |
| 3,319,637 | 7/1966 | Gore | 134/57 D |
| 3,322,507 | 5/1967 | Smith | 422/261 |
| 3,322,674 | 5/1967 | Friedman | 252/90 |
| 3,334,147 | 8/1967 | Brunelle et al. | 260/611 |
| 3,382,178 | 5/1968 | Lissant et al. | 252/156 |
| 3,390,093 | 6/1968 | Feierstein | 252/534 |
| 3,399,676 | 9/1968 | McLaughlin | 604/84 |
| 3,417,024 | 12/1968 | Goldwasser | 252/135 |
| 3,441,511 | 4/1969 | Otrhalek et al. | 252/135 |
| 3,444,242 | 5/1969 | Rue et al. | 260/611 |
| 3,491,028 | 1/1970 | Crotty et al. | 252/103 |
| 3,535,258 | 10/1970 | Sabatelli et al. | 252/105 |
| 3,556,982 | 1/1971 | Kaminsky et al. | 208/11 |
| 3,574,561 | 4/1971 | Nickerson et al. | 422/106 |
| 3,579,455 | 5/1971 | Sabetelli et al. | 252/135 |
| 3,595,438 | 7/1971 | Daley et al. | 222/67 |
| 3,639,286 | 1/1972 | Ballestra et al. | 252/109 |
| 3,649,545 | 3/1972 | Susuki et al. | 252/174 |
| 3,680,070 | 7/1972 | Nystuen | 340/244 |
| 3,687,613 | 8/1972 | Rickard | 423/242 |
| 3,700,599 | 10/1972 | Mizuno et al. | 252/99 |
| 3,727,889 | 4/1973 | Nagel | 259/1 R |
| 3,789,011 | 1/1974 | Tanaka | 252/131 |
| 3,816,427 | 6/1974 | Loliger et al. | 422/278 |
| 3,850,344 | 11/1974 | Burge et al. | 222/37 |
| 3,856,932 | 12/1974 | May | 252/93 |
| 3,899,436 | 8/1975 | Copeland et al. | 252/99 |
| 3,933,670 | 1/1976 | Brill et al. | 252/99 |
| 3,936,386 | 2/1976 | Corliss et al. | 252/99 |
| 3,937,399 | 2/1976 | Haley | 239/1 |
| 4,014,808 | 3/1977 | Herpers, Jr. et al. | 252/135 |
| 4,020,865 | 5/1977 | Moffat et al. | 137/268 |
| 4,063,663 | 12/1977 | Larson et al. | 222/52 |
| 4,147,650 | 4/1979 | Sabatelli et al. | 252/99 |
| 4,209,864 | 7/1980 | Lindauer | 4/228 |
| 4,294,280 | 10/1981 | Tom | 137/268 |
| 4,318,891 | 3/1982 | Kim | 422/263 |
| 4,426,362 | 1/1984 | Copeland | 422/263 |
| 4,438,010 | 3/1984 | Lindauer | 252/91 |
| 4,469,613 | 9/1984 | Munteanu et al. | 252/92 |

63
60
60
21f
24
44
43
42
21g
71
21a
24
44b
40
20
22
21
21b
50
22
21c
21e
21d
50a
44
50b
50c
43
40
44b
44
45
42
43a
41
46
44a
47
45
44
72
42a
9
9
44
44b
40
43
42
20
21b
21
21c
21d
35
21e
34
30a
30
21f
44b
21
44
43
32
62
60
100a
50a
42
61
41
71
100
20
21a
21b
50c
71
42a
50b
43a
21c
30b
44a
21e
103
35
72
21d
70

CAST DETERGENT-CONTAINING ARTICLE AND METHOD OF MAKING AND USING

Matter enclosed in heavy brackets [ ] appears in the original patent but forms no part of this reissue specification; matter printed in italics indicates the additions made by reissue.

This application is a divisional of Ser. No. 234,940, filed Feb. 17, 1981, which is a continuation-in-part of copending application Ser. No. 123,956, filed Feb. 25, 1980, now abandoned, which is a continuation-in-part of application Ser. No. 875,784, filed Feb. 7, 1978, now abandoned. This application also contains subject matter disclosed in copending application Ser. No. 966,620, filed Feb. 5, 1978, now abandoned.

FIELD OF THE INVENTION

This invention relates *to* a novel solid cast detergent-containing article which is particularly useful in institutional dishwashing machines and industrial washing machines. Another aspect of this invention relates to a method for producing the detergent-containing article. Another aspect of this invention relates to a method for using the detergent-containing article. Still another aspect of this invention relates to a method for isolating reactive and incompatible components within a solid cast detergent to minimize interaction between them during manufacture, storage, or dispensing.

DESCRIPTION OF THE PRIOR ART

Conventional institutional and industrial spray washing machines employ liquid or powdered detergents which are generally added to the wash tank by means of an automatic dispenser system. All forms of such detergents, whether liquid or solid, have stability problems and other problems associated with their manufacture, dispensing, or use. These problems have been discussed extensively in prior art publications and patent literature, and it is not practical to do anything more than summarize these discussions. In the early days of the development of solid detergents, when these detergent products were relatively low in performance compared to the products of today, the problems were less severe. However, the advent of high performance products, stimulated in part by increased aesthetic and sanitary standards and a demand for shorter wash times has generally been characterized by the development of more complex detergent compositions which are more hazardous to the user, less stable, and more difficult to dissolve in a satisfactorily uniform manner.

For example, higher performance solid detergents generally means higher alkalinity (e.g. greater concentrations of sodium hydroxide)—higher even to the point of posing safety hazards to the user. Historically, detergents used for warewashing have been relatively low in alkalinity. The extensive use of aluminum trays and utensils, the presence of soft metals in wash pump impellers and other factors generally prevented the use of high alkalinity detergents. Recently, however, there has been a trend toward the use of high alkalinity, higher performance products. This trend has been partially the result of the increased usage of stainless steel and corrosion resistant plastics in the production of utensils. In addition, the aforementioned increased standards and shorter wash times required by the increased volume of business in eating establishments have created a demand for these higher performance products. The safety hazard of highly alkaline warewashing detergents can be high enough to justify extraordinary means for minimizing contact between the user and the detergent composition.

In addition to alkali metal hydroxides (e.g. sodium hydroxide), chemicals used in high performance products, particularly for hard surface cleaning (e.g. warewashing) include phosphates, silicates, chlorine containing-compounds, defoamers and organic polyelectrolyte polymers. See U.S. Pat. No. 3,166,513, issued Jan. 19, 1965 (Mizuno et al). U.S. Pat. No. 3,535,285, issued Oct. 20, 1970 (Sabatelli et al), U.S. Pat. No. 3,579,455, issued May 18, 1971 (Sabatelli et al), U.S. Pat. No. 3,700,599, issued Oct. 24, 1972 (Mizuno et al), and U.S. Pat. No. 3,899,436, issued Aug. 12, 1975 (Copeland et al). The alkali metal hydroxides in these compositions are very effective in removing most stubborn food soils, but a source of available chlorine is usually included to control food strains, such as tea and coffee stains. The defoamer is usually included to control foam created by a proteinaceous soil and saponified fats. The use of chlorinated cyanurates as a source of available chlorine in detergents used to clean hard surfaces is disclosed in U.S. Pat. No. 3,166,513, issued Jan. 19, 1965 (Mizuno et al), U.S. Pat. No. 3,933,670, issued Jan. 20, 1976 (Brill et al), U.S. Pat. No. 3,936,386, issued Feb. 3, 1976 (Corliss et al). These patents also describe various means for obtaining storage stable chlorine bearing detergents. The use of defoamers in detergent compositions is disclosed by U.S. Pat. No. 3,048,548, issued Aug. 7, 1962 (Martin et al), U.S. Pat. No. 3,334,147, issued Aug. 1, 1967 (Brunelle et al), and U.S. Pat. No. 3,442,242, issued May 13, 1969 (Rue et al).

One problem associated with detergents containing both an active chlorine source and an organic defoamer has been a substantial loss of available chlorine in a relatively short period of time. This problem is described in a number of the above references and in the article by R. Fuchs, J. Polkowski, and Carfagno, "Agglomerated Automatic Dishwasher Detergents". Chemical Times and Trends, pages 37–42 (October, 1977). One solution to this problem has been to absorb the organic defoamer onto an inorganic carrier particle, thus "encapsulating" the defoamer, see U.S. Pat. No. 3,306,858, issued Feb. 28, 1967 (Oberle). While a chlorine stability problem is present in low alkalinity detergents containing defoamers, the problem is more acute with high alkalinity detergents because many defoamers and chlorine-containing compounds are not stable in the presence of highly alkaline chemicals such as sodium hydroxide.

In addition to the chlorine stability problem, several additional problems have existed with high performance powdered detergent compositions which have been used in institutional and industrial washing machines. One of these problems has been caused by differential solubility of the detergent components. Not all of the components of standard detergents dissolve at the same rate or have the same equilibrium solubilities. For example, a fine, soluble particle such as sodium dichloroisocyanurate dihydrate, a common source of available chlorine, may dissolve more rapidly than some hardness sequestrants of surfactants, i.e. common detergent component. Thus, when a dispenser is charged with a powdered detergent containing both of these components, the first effluent from the dispenser will usually be overrich in available chlorine while the last effluent before the dispenser is recharged will usually be poor in available chlorine.

Another type of differential solubility problem exists with many common defoamers. Many defoamers have an oily consistency and are sparingly water soluble. When detergents containing these defoamers are dispensed from a conventional water-in-reservoir dispenser, the oily defoamer floats to the top and feeds the wash tank in an erratic fashion.

Another problem may exist with a powdered detergent if its components are of different particle sizes and densities. Variations in particle size and density between components may lead to segregation during manufacturing, shipping, and handling. Even when uniform distribution can be achieved during manufacturing, handling and shipping may cause segregation. Segregation leads to non-uniformity in the composition of the detergent when it is withdrawn from the container. Agglomeration of the components has been used to minimize the segregation problem. However, the use of agglomeration usually requires recycling of any particles which are too large or too small, which can be a significant percentage of the product.

As noted previously, it is desirable for safety and convenience to minimize contact between the user and the high-performance or highly alkaline detergent composition, and such lessened contact can be one of the many benefits of automatic dispensing. In the case of liquid detergents, it is relatively easy to provide an automatic dispensing system and method. For example, liquid detergents can simply be pumped into the wash tank or reservoir directly from their shipping containers.

Solid detergents (which can be in briquette, or, most typically, in powdered form) present much more complicated automatic dispensing problems. Several approaches have been devised for [attaching] *attacking* these problems—that is, for utilizing solid phase detergents without losing the benefits of automatic dispensing. In one approach, detergents used in large conveyor type machines are dispensed directly from their shipping containers by means of a dispensing system similar to that described in U.S. Pat. No. 3,595,438, issued July 27, 1971 (Daley et al). The shipping container is inverted and placed over a detergent dispenser reservoir and a water spray is used to dissolve the detergent from the drum as needed. A system for dissolving powdered detergent from a five to ten gallon capacity shipping pail is also known, see U.S. Pat. No. 4,020,865, issued May 3, 1977 (Moffat et al). In short, the solid powdered detergent in the shipping container is not in a form which normally would be introduced directly into the wash tank of the washing machine, and it is generally preferred in the art to convert the powder into a liquid, e.g. by dissolving the powder with water in a special apparatus designed to carry out the dissolving step.

The dissolving apparatus need not be physically remote from the washing machine. Indeed, it is common practice to mount dissolving/dispensing devices directly above—or on the side wall of—the wash tank of the machine. One typically used type of machine-mounted dispenser is the so-called water-in-reservoir type. (The water-in-reservoir approach is not limited to machine-mounted dispensers, however; in machine-mounted applications, the water-in-reservoir dispenser is generally used in single tank warewashing machines.) Typically, the water-in-reservoir type of dispenser makes up a concentrated solution of detergent from the powder in the reservoir by means of swirling action or agitation provided by incoming water. The concentrated solution is delivered directly to the wash tank by gravity or through a delivery tube. The concentration of the detergent in the wash tank can be maintained at a present level by means of a conductivity sensing controller similar to that described in U.S. Pat. No. 3,680,070, issued July 25, 1972 (Nystuen).

Various other types of devices will dissolve and dispense powdered detergents and can be mounted directly on the washing machine. For example, U.S. Pat. No. 4,063,663, issued Dec. 20, 1977 (Larson et al) described a type of dispenser in which the powdered detergent is placed over a conical or hemispherical screen and an aqueous spray from beneath the screen is used to dissolve the detergent. The concentrated solution produced by the spray is collected and directed to the wash tank. The dispenser differs from the water-in-reservoir type in that there is no water standing in the powder dispenser and the bulk of the powder remains dry. Otherwise, this type of dispenser operates in a manner similar to the water-in-reservoir type.

Among the other types of powdered detergent dispensers are small dispensers which hold from four to six pounds of detergent. The hopper of such dispensers can be filled from detergent-containing drums by means of a scoop or by the use of small individual (i.e. two pound) pouches of detergent. Dispensing systems for washing systems consisting of multiple hoppers which are filled with different chemicals or mixtures of chemicals are also known.

Dispensing system for dispensing briquettes of detergent are also known in the art. See U.S. Pat. Nos. 2,382,163, 2,382,164, 2,382,165 all issued Aug. 14, 1945 to MacMahon and U.S. Pat. No. 2,412,819, issued Dec. 17, 1946 (MacMahon). The detergent briquettes are dispensed from a modified water-in-reservoir round, pot-shaped dispenser. The briquettes (usually three) are held in a mesh basket which forms a slot about 1¼ inches wide across the diameter of the pot. The dissolving action is provided by a stream of water directed against the lower-most briquette and from the swirling action of water around the submerged portion of the lower-most briquette. Like the water-in-dispenser type devices, water is left standing in the reservoir. This type of system has the advantage of making it visually possible to determine when the detergent dispenser reservoir needs replenishing.

The MacMahon patents also disclose detergent briquette compositions and methods of manufacturing the briquettes. The briquette compositions and the methods of manufacture which are disclosed appear to require the presence of a silicate and trisodium polyphosphate or sodium carbonate. Detergent bars of cakes comprising a significant level of an organic detergent and tripolyphosphates are also known. See U.S. Pat. No. 3,639,286, issued Feb. 1, 1972 (Ballestra et al). Compressed tablets containing detergents are also known, see U.S. Pat. No. 2,738,323, issued Mar. 14, 1956 (Tepas, Jr.) and U.S. Pat. No. 3,417,024, issued Dec. 7, 1968 (Goldwasser).

In the field of dispensing solid detergent [to] *into* conventional institutional and industrial washing machines for spray cleaning of hard surfaces (e.g. warewashing), the briquette detergent approach does not appear to have attained the same degree of commercial success as powdered detergents.

When one leaves behind the field of high performance or highly alkaline detergents, one finds that a variety of dispensers and containers for ordinary soap, compressed detergent, powder, or the like have been disclosed. See, for example, U.S. Pat. Nos. 2,686,080 (Wood), issued Aug. 10, 1954 and 2,920,417 (Wertheimer), issued January, 1960.

SUMMARY OF THE INVENTION

It has now been found that the chlorine stability, differential solubility, segregation, and safety problems described above can be minimized by forming a solid cast detergent in a disposable mold and dispensing or using the detergent directly from the mold/cast detergent combination. That is, the combination of the cast detergent and the disposable mold in which it was formed provides an article of commerce capable of dispensing dissolved solids from substantially only one surface—the surface which was the free or unsupported surface in the mold. This detergent article can be designed or structured to further minimize chlorine stability and differential solubility problems, e.g. by including the chlorine source and/or the defoamer as preformed plugs or cores encased in the cast detergent composition.

Thus, the present invention involves a process for forming and a method for using a three-dimensional, solid cast detergent composition containing an alkaline hydratable solid component, at least one other solid component, and a receptacle-shaped mold surrounding and containing the detergent composition on all but one surface. The detergent composition is normally formed by mixing and heating the components in an aqueous solution, thickening the solution and preferably also cooling it, pouring the solution into a mold, and allowing the mixture to solidify, it being understood that the solidification can involve one or more physico-chemical mechanisms, including "freezing", precipitation from solution, etc. The aforementioned preformed plugs or cores of additional components can be inserted in the mixture after it has been added to a mold and before it has solidified.

The cast detergent composition is preferably left in the disposable mold in which it was cast. Alternatively, the cast detergent can be demolded and inserted in an inexpensive container or receptacle which has substantially the same configuration as the mold, since in either case the cast detergent is surrounded on all but one surface, as described previously. The thus-surrounded cast detergent isused by placing its exposed surface in a drainable position (preferably fixed) within a detergent dispensing apparatus. A fixed drainable position is one in which the aforementioned unsurrounded, exposed surface is fixed with respect to the horizontal and a potential impinging spray of liquid such that the unsurrounded, exposed surface permits gravity flow therefrom, either because of an inclination from the horizontal by a few degrees (e.g. by 10°-90°) or by inclination beyond 90°, i.e. partial or total inversion up to and including a totally inverted or downward-facing position. A spray of liquid impinging on the drainable (inclined or inverted) surface, suitably controlled in duration, provides a draining action or gravity flow of liquid detergent which drains downward off of the drainable surface to the washing machine into which the detegent is to be dispensed. Control over the duration of impingement (hence the duration of downward flow) has the effect of controlling the concentration of detergent in the washing machine. The dispensing apparatus is not a water-in-reservoir type, since it dispenses the flow of liquid detergent about as fast as this flow is formed by the spraying action.

DETAILED [DESCTIPTION] *DESCRIPTION*

Raw Materials

Figure 1:
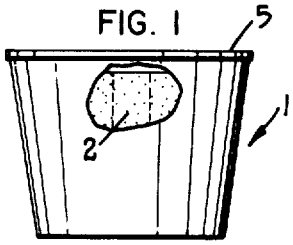
FIG. 1 is a partial cut-away side view of a disposable mold containing the cast detergent of this invention.

One necessary component for producing cast detergent compositions of the present invention is a hydratable chemical. The term "hydratable chemical" as used herein includes chemicals forming both discrete and continuous states of hydration and thus means a chemical which is capable of absorbing or combining with water (e.g. 0.2-20 moles of water per mole of chemical) to form either type or state of hydration. The hydratable chemical will normally be alkaline, that is, a one weight-percent aqueous solution of the chemical will have a pH of greater than 7.0 at 23° C. Since the detergent compositions used in this invention are highly alkaline, it is preferred that the hydratable component of the composition be alkaline in nature. Hydratable chemicals useful in the practice of this invention include alkali metal hydroxides, such as sodium hydroxide and potassium hydroxide; silicates, such as sodium metasilicate; phosphates, particularly phosphates of the formula $M—PO_3M)_nOM$ or the corresponding cyclic compounds $$\left[PO_3M \leftarrow PO_3M \rightarrow_n PO_3M\right],$$

wherein M is an alkali metal and n is a number ranging from 1 to about 60, typically less than 10 for cyclic phosphates, typical examples of such phosphates being sodium or potassium orthophosphate and alkaline condensed phosphates (i.e. polyphosphates) such as sodium or potassium pyrophosphate, sodium tripolyphosphate, sodium hexametaphosphate, etc.; carbonates such as sodium or potassium carbonate; borates, such as sodium borate; etc. Combinations of two hydratable chemicals, for example, sodium hydroxide and sodium tripolyphosphate, and combinations of alkaline condensed phosphates with organic sequestering agents and/or alkali metal hydroxides have been found to work particularly well in the practice of this invention.

A second necessary component of the detergent compositions of this invention is water. Water is used to form a uniform medium (solution or dispersion) containing the detergent components; the uniform medium being cast into a mold and solidifying by a solidification mechanism described previously. Water may be added as a separate ingredient or in combination with one of the other components, for example as an aqueous solution of 50% sodium hydroxide.

To obtain the advantages of this invention, at least two solid components are needed. If only one solid component were used, differential solubility and segregation problems would not exist and there would be few advantages to forming a cast composition. The advantages of a cast detergent composition over a conventional powdered detergent composition are described more fully hereinafter.

In addition to those components previously described, other conventional detergent components and fillers can be included. For example, it is common to include a source of available chlorine and a defoamer. Many chlorine sources can be used including chlorinated isocyanurates, such as sodium dichloroisocyanurate dihydrate, and hypochlorites, such as calcium and lithium hypochlorite. As more fully hereinafter described, when an available chlorine containing component is included in the composition of this invention it is preferably incorporated in the composition as a preformed plug or core. Defoamers are also normally included in a detergent compositions. Typically, a "defoamer" is a chemical compound with a hydrophobe/hydrophile balance suitable to reducing the stability of protein foam. The hydrophobicity can be provided by an oleophilic portion of the molecule (e.g. an aromatic alkyl or aralkyl group; an oxypropylene unit or oxypropylene chain, or other oxyalkylene functional groups other than oxyethylene, e.g. tetramethylene oxide). The hydrophilicity can be provided with oxyethylene units or chains or blocks and/or ester groups (e.g. organophosphate esters), salt-type groups, or salt-forming groups. Typically, defoamers are nonionic organic surface-active polymers having hydrophobic groups or blocks or chains and hydrophilic ester-groups, blocks, units, or chains, but anionic, cationic, and amphoteric defoamers are known. For a disclosure of nonionic defoaming surfactants, see U.S. Pat. No. 3,048,548, issued Aug. 7, 1962 (Martin et al), U.S. Pat. No. 3,334,147, issued Aug. 1, 1967 (Brunelle et al), and U.S. Pat. No. 3,442,242, issued May 13, 1969 (Rue et al). Phosphate esters are also suitable, e.g. esters of the formula $RO—PO_3M)_nR$, wherein n is as defined previously and R is an organic group or M (as defined previously), at least one R being an organic group such as oxyalkylene chain. If a defoamer is included it may be included as a preformed plug or core, as more fully described hereinafter. If it is included as a preformed core or plug it must be a solid, or be capable of being combined with other components to form a solid, at room temperature. Wax-like materials can be used to further isolate the chlorine source or defoamer in the core from the surrounding cast article.

THE DETERGENT COMPOSITION

The hydratable chemical or combination of hydratable chemicals will normally comprise at least 30%, and preferably 60%, by weight of the cast detergent composition. The water of hydration will normally comprise more than 5 weight-% (e.g. 10–35 weight-%) of the cast detergent composition. Stated another way, the water of hydration can comprise more than about 15 parts by weight per 100 parts by weight (15 phr), e.g. 25–90 phr, of the hydratable chemical or combination of chemicals. Performance-improving additives such as available chlorine producing components and defoamers will normally comprise minor amounts of the composition, that is, less than 5%. As will be explained subsequently, the cast detergent composition can also contain a polyelectrolyte.

Typical three-component compositions of this invention can be formulated from (1) a phosphate or other hardness-precipitating or hardness sequestering agent, (2) an alkali metal hydroxide, and (3) water. Typical four or five component compositions would further include a defoamer and/or a neutral inorganic salt (alkali metal halides, sulfates, etc.) and/or a chlorine source and/or a thickening agent, thixotrope, suspending agent or organic chelating or sequestering agent, or the like.

Typical detergent compositions of this invention employ a condensed alkali metal phosphate for the sequestering of hardness ($Mg++$ and $Ca++$ ions). However, organic chelating or sequestering agents (citric acid, polyelectrolytes such as the polyacrylates of molecular weight 1000–3000, etc.) have been used as alternatives to or in combination with the condensed phosphates; see, for example, U.S. Pat. No. 3,535,285, issued Oct. 20, 1970 (Sabatelli et al), U.S. Pat. No. 3,579,455, issued May 18, 1971 (Sabatelli et al), U.S. Pat. No. 3,700,599, issued Oct. 24, 1972 (Mizuno et al), and U.S. Pat. No. 3,899,436, issued Aug. 12, 1975 (Copeland et al). As is known in the art, polyacrylates (particularly alkali metal salts of polyacrylic acid and its copolymers) can function as thickeners in aqueous systems. Cast detergent compositions of this invention can contain up to 15% by weight of polyelectrolytes, as the sole sequestering agent or in combination with alkali metal condensed phosphates.

Figure 2:
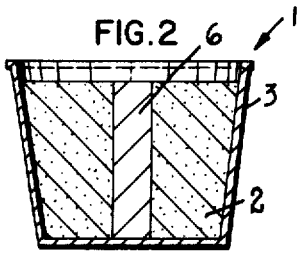
FIG. 2 is a cross-sectional view of a disposable mold containing the cast detergent of this invention. The cast detergent includes a preformed plug or core comprised of an additional ingredient or ingredients.
Figure 3:
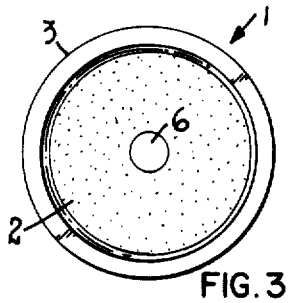
FIG. 3 is a plan view of the article illustrated in FIG. 2.

One embodiment of the solid, cast detergent-containing article of this invention is generally shown by 1 in FIGS. 1 through 3. The article includes *a* disposable container or mold 3 into which base detergent 2 was cast or allowed to solidify. During shipping, article 1 will normally include lid or cover 5. Lid or cover 5 can be made of the same or similar material as used to make mold 3. As will be explained subsequently, this material is ordinarily alkaline-resistant, non-breakable, and inexpensive. Expensive corrosion-resistant metals or plastics can be used, if provision can be made for their recycling, but "disposable" materials would normally be preferred for most institutional uses. As illustrated in FIG. 2, the cast detergent composition is surrounded by and in contact with mold 3 on all but the upper surface of the solid cast detergent. A cross-section of the solid cast detergent 2 can be more than a centimeter thick (e.g. 2–20 cm thick). The area of the upper surface can easily exceed 100 $cm^2$, e.g. 125 $cm^2$ to 1000 $cm^2$ or more. Unlike compressed detergent tablets, it has been found that cast detergent blocks can be made very large-almost any desired size.

In one embodiment of this invention, cast detergent base 2 will include one or more preformed plugs or cores 6, as illustrated in FIGS. 2 and 3. At least one preformed plug will normally comprise a chlorine source. When a plurality of preformed plugs are used they will normally comprise different, incompatible ingredients. For example, one plug could comprise a chlorine source while a separate plug could comprise a defoamer. By incorporating a chlorine source in one preformed plug and a defoamer in a separate preformed plug, degradation of the chlorine source, and the resultant loss of available chlorine, which often occurs when chlorine sources and defoamers come in contact, can be minimized. Thus, by incorporating preformed plugs of incompatible ingredients in the solid, cast detergent composition of this invention, the stability problems associated with many conventional powdered detergents can be minimized. To minimize reactivity between the base detergent and any material added as preformed cores, the core material may be optionally encased in a film or material which would not react with the core material or the detergent base. This coating could be comprised of a natural wax, a synthetic wax, a phosphate ester, or the like.

Some active chlorine sources such as calcium hypochlorite have been found to react very slowly at the plug-base detergent interface and would not normally need to be encased in a film or the like. However, other chlorine sources such as sodium dichloroisocyanurate dihydrate have been found to be more reactive, in which case a protective film would be beneficial.

Mold or container 3 can be made of any alkali-resistant material which can withstand moderately elevated temperatures, e.g. 150° F., and which can be formed into and hold the desired shape. Since the mold is generally intended to be "disposable" (i.e. not intended for re-use as a mold), inexpensive materials are preferred such as thermoplastics, resin-impregnated heavy paper or cardboard, and the like. Inexpensive but fragile material such as glass or ceramics are less preferred due to handling or shipping problems, relatively flexible materials being preferred. Molds made of plastic (e.g. inexpensive thermoplastics) have been found to be particularly useful.

Figure 4:
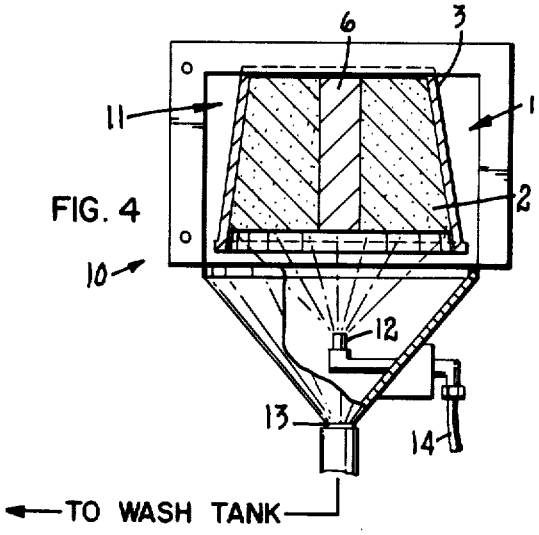
FIG. 4 illustrates the article of FIGS. 2 and 3 placed in an apparatus for dispensing the detergent composition.

The solid, cast detergent-containing article of FIGS. 1–3 can be used as illustrated in FIG. 4. FIG. 4 illustrates detergent dispensing apparatus 10 which can be part of a conventional institutional or industrial washing machine (not shown). Article 1, including base detergent 2, preformed core 6, and container 3 is placed in a totally downward-facing or totally inverted position over spray means 12 which is connected to a water source 14, whereby the exposed surface of detergent 2 becomes a drainable surface. When water source 14 is turned on, spray means 12 causes water to impinge on the exposed surface of detergent 2 and core 6. The detergent and the core dissolve, creating a gravity flow of liquid aqueous detergent which flows downwardly through pipe 13 to the wash tank or washing zone of the washing machine (not shown). Detergent base 2 and preformed core 6 can be formulated to dissolve at substantially the same rate and thus supply the tank with a consistent ratio of ingredients.

By controlling the spray time the amount of detergent, and thereby the concentration of detergent, in the wash can be controlled. In other words, the liquid aqueous detergent formed as a result of the impingement of the spray on the exposed surface of detergent 2 flows by gravity into pipe 13 generally simultaneously with its formation within dispensing apparatus 10. Standing water or aqueous liquid is not permitted to accumulate within dispensing apparatus 10.

Referring to FIGS. 6 through 9 there is generally disclosed at 20 a detergent dispenser for solid detergent compositions of the block-type, generally constructed according to the principles of this invention. That embodiment of the dispenser 20 illustrated in these Figures is one of the type suitable for servicing relatively smaller wash applications, wherein the detergent dispenser is generally mounted directly to the washing machine or immediately adjacent thereto, such that the concentrated detergent solution formed by the dispenser apparatus will flow by gravity into the wash tank of the washing machine proper (not illustrated).

The dispenser 20 has a housing portion 21, constructed of any suitable material capable of withstanding exposure to highly caustic detergent solutions, and is preferably configured of stainless steel or molded plastic material. The housing 21 has a generally planar back wall 21a suitable for direct engagement with and mounting to a vertical mounting surface or wall (not shown). The back wall 21a includes a plurality of mounting slots 22 formed therethrough, to enable fixed mounting of the housing 21 to a solid vertical surface such as a vertical wall of a washing machine or a vertical wall disposed adjacent a washing machine.

The housing 21 defines a substantially enclosed inner cavity 30. For ease of reference and distinguishing the various portions of the inner housing cavity 30, referring to FIG. 9, the upper portion of the inner cavity will be referred to as the spray region 30a of the cavity, and the lower portion of the inner cavity 30 will be referred to as the collector or discharge region 30b thereof, it being understood that gravity flow prevents detergent liquid from standing or accumulating in the collector or discharge region 30b.

Figures 6, 7, 8, 9:
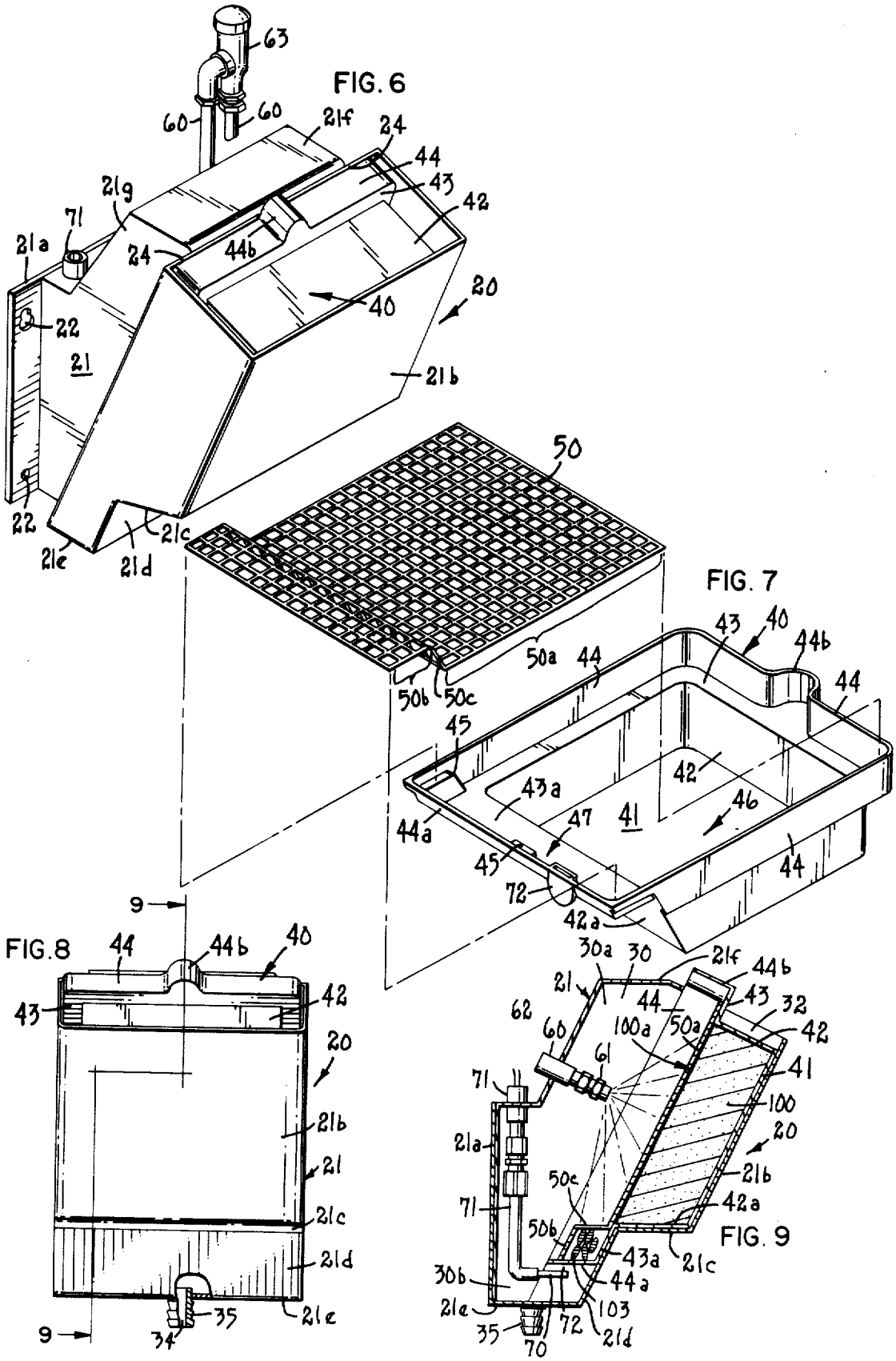
FIG. 6 is a view in perspective of a solid detergent dispenser constructed according to the principles of this invention.
FIG. 7 is an exploded view in perspective of one embodiment of the cartridge-type receptacle member for holding a charge of solid block detergent, as disclosed in FIG. 6.
FIG. 8 is a view in front elevation with portions thereof broken away, of the solid detergent dispenser disclosed in FIG. 1.
FIG. 9 is a sectional view of the solid detergent dispenser disclosed in FIG. 9, taken generally along the line 9—9 of FIG. 8.

The upper portion of the housing 21 defines a mouth or access port 32 opening into the inner cavity 30. Discharge region 30b includes a hose clamp extension 35 (FIGS. 8 and 9) which defines a passageway or discharge port 34 (FIG. 8) through the housing 21 for concentrated detergent solution collected or accumulated within the discharge region 30b of the inner cavity 30 of the housing 21. The hose clamp extension 35 has a plurality of annular ribs configured for engaging the inner walls of a connecting conduit or hose (not illustrated), for directing fluid flow from the discharge port 34 (FIG. 8).

An upper front wall 21b of the housing 21 projects downwardly from the access port 32 at an inclined angle to the horizontal. In the embodiment of the invention illustrated in FIGS. 6–9, the upper front wall 21b forms an angle of approximately 60 degrees with the horizontal. The upper front wall 21b terminates at and is continuous with a first lower wall 21c of the housing 21, which is also slightly inclined with respect to the horizontal and lies in a plane generally parallel to that of the upper front wall 21b. The lower front wall 21d terminates at and is continuous with a bottom wall 21e (FIG. 9) of the housing. In FIG. 9, the bottom wall 21e is generally planar, however the bottom wall 21e could assume many different configurations (such as ramp-shaped or funnel-shaped), and is generally configured so as to direct downward any detergent solution formed within cavity 30 by the impingement action of the liquid spray from nozzle 61 (FIG. 9) on surface 100a of cast solid block detergent 100 (FIG. 9) into discharge port 34.

The back wall 21a extends between the bottom wall 21e and an upper wall, generally designated at 21f, which extends to and defines one edge of the access port 32. When viewed in cross-section as in FIG. 9, that region of the inner cavity 30 generally located between the upper front wall 21b, the first lower wall 21c and the back wall 21a and the upper wall 21f comprises the upper spray region 30a; whereas that region of the inner cavity 30 generally located between the lower front wall 21d and the back wall 21a, and extending down to the bottom wall 21e generally comprises the discharge region 30b.

The housing 21 further has a pair of oppositely disposed side walls 21g, each configured to define a flange or land region 24 extending into the inner cavity 30 in generally parallel spaced relationship to one another. The land regions 24 are disposed to extend from the access port 32 downwardly to the bottom wall 21e, and cooperatively form with the front wall 21b oppositely disposed channels or races within the inner cavity 30 for slidably retainably engaging a cartridge member 40.

One embodiment of a cartridge member 40 suitable for removable insertion within the access port 32 of the dispenser 21 is illustrated in more detail in FIG. 7. Referring to FIG. 7, the cartridge 40 is basically a receptacle or container-shaped member suitable for retainably holding in fixed position relative thereto a cast solid block of solid detergent composition. The cartridge member 40 generally comprises a bottom surface 41, a lower peripheral side wall portion 42, an intermediate ledge region 43 and an upper peripheral side wall portion 44. The lower peripheral side wall portions 42 extend between the bottom surface 41 and the intermediate ledge region 43, with all except one surface of the lower peripheral side walls (that surface designated as 42a) being disposed generally perpendicular to the bottom surface 41. The non-perpendicular lower peripheral side wall portion 42a is configured to define an angle with the bottom surface 41 corresponding to the included angle defined between the upper front wall 21b and the first lower wall 21c of the dispenser housing 21 (see FIG. 9). The fourth side of the upper peripheral side wall 44a forms an included angle with the general plane of the intermediate ledge region 43 substantially equal to that of the included angle formed between the lower front wall 21d and the bottom wall 21e of the dispenser housing 21 (see FIG. 10).

The 43a portion of the intermediate ledge region is somewhat wider (as measured between corresponding upper and lower peripheral side wall portions) than the width of the intermediate ledge region 43 of the other portions of the cartridge member 40. A plurality of raised land areas or mounting surfaces 45 project upwardly from the intermediate ledge region 43a, the upper surfaces respectively thereof lying generally in a common plane.

The lower peripheral side walls 42 and 42a cooperatively define with the bottom surface 41 a first receptacle-shaped container 46 for retainably holding a geometrically shaped volume or mass of cast solid detergent composition 100 (see FIG. 9). The elongated intermediate ledge region 43a defines the bottom surface of a second receptacle-shaped container, generally designated [at] *as* 47 (see FIGS. 7 and 9). A screen or mesh member 50 is configured for mounting to the intermediate ledge region 43 (other than at the extended intermediate ledge region 43a) and to the raised mounting surfaces 45, in spaced relationship to the underlying extended intermediate ledge region 43a, so as to overlie respectively the first and second receptable-shaped container regions 46 and 47. In the preferred embodiment of the invention, the first receptacle-shaped container 46 retainably holds a solid block of detergent composition which was cast directly into the receptacle-shaped container portion 46 of the cartridge member 40, the container portion 46 physically forms the mold in which the solid cast detergent 100 (FIG. 100) is manufactured. The retainably held charge of solid detergent 100 within the container portion 46 of the cartridge member 40 defines a broad, generally planar upper surface 100a (FIG. 9) lying generally in the same plane as the intermediate ledge region 43 or slightly there below. The upper detergent surface 100a is inclined from the horizontal (hence "drainable") and is disposed for exposure to spray from a nozzle means, hereinafter described in more detail.

The screen member 50 has a first generally planar portion 50a (FIG. 7), a second generally planar portion 50b and an interconnecting wall portion 50c. The first screen portion 50a is sized to fit between the opposing upper peripheral side walls 44 and is configured for mounting to the three contiguous portions of the intermediate ledge regions 43, exclusive of ledge region 43a, for substantially overlying the first receptacle-shaped container portion 46 of the cartridge member 40. The second portion 50b of the screen member 50 lies in a plane generally parallel to and spaced above that of the first screen portion 50a, and is configured for mounting to the plurality of raised mounting surfaces 45 so as to substantially overlie the extended intermediate ledge region 43a and the second receptacle-shaped container region 47 of the cartridge member 40. The interconnecting wall portion 50c of the screen member 50 forms included angles with the first and second 50a and 50b portions of the screen member 50, substantially the same as those included angles which the lower peripheral side wall portion 42a forms with the bottom surface 41 and with the intermediate ledge region 43a of the cartridge member 40. When mounted to the cartridge member 40, the interconnecting wall portion 50c of the screen member 50 forms included angles with the first and second 50a and 50b poritons of the screen member 50, substantially the same as those included angles which the lower peripheral side wall portion 42a forms with the bottom surface 41 and with the intermediate ledge region 43a of the cartidge member 40. When mounted to the cartridge member 40, the interconnecting wall portion 50c of the screen member 50 lies generally co-planar with the lower peripheral side wall portion 42a, and operatively forms an extension thereof, to define with the extended intermediate ledge region 43a and the upper peripheral side wall portion 44a and those oppositely disposed portions of the upper peripheral side wall 44 lying contiguous with the extended intermediate ledge region 43a, the second receptacle-shaped container 47.

The cartridge member 40 may be constructed of any suitable material that is capable of withstanding exposure to highly caustic detergent solutions, and is preferably configured of molded plastic material such as polyethlene or polypropylene. The cartridge member can be supplied with solid block detergent and sold as an article of commerce, wherein the entire cartridge member 40 or portions thereof can be discarded after the detergent charge retainably held thereby has been exhausted. When the cartridge member is a disposable item, the screen member 50 would be permanently welded or bonded to the intermediate ledge region 43 and the plurality of raised land areas 45.

Alternatively, the cartridge member 40 could be a re-usable item, possibly constructed of stainless steel, wherein the screen member 50 could be detachably secured to the underlying cartridge member 40 so as to enable re-charging of the solid block detergent retainably held by the various receptacles of the cartridge member. The screen member 50 may be of any suitable material capable of withstanding exposure to highly caustic detergent solutions, and is in the preferred embodiment, preferably constructed of a plastic material. The mesh size of the screen member 50 is configured so as to be small enough to prevent solid particles of the solid block detergent held by the receptacle-shaped containers of the cartridge member 40 from passing therethrough, yet must be large enough so as to permit relatively unobstructed passage therethrough of a pressurized spray pattern directed at the undelying exposed surfaces of the solid block detergent. In general, the mesh size of the screen member 50 should be no larger than the largest dimension of the discharge port 34, so as to prevent any solid chunks or pieces of the solid block detergent which would pass therethrough from clogging the free flow of concentrated detergent solution through the discharge port 34.

The first receptacle-shaped container 46 of the cartridge member 40 can be configured to hold the solid cast detergent composition of this invention. The second receptacle-shaped container 47 can, if desired, be configured for retainably holding a long narrow block of a second solid block detergent composition (not shown). Preferably, however, container 47 is configured to hold a plurality of pillow-shaped pieces, briquettes, tablets or pellets of detergent ingredients such as a chlorine source or a defoamer of the type described herein, particularly in those cases wherein a defoamer and/or chlorine-releasing agent plug has not been inserted into the cast detergent 100. The briquette or tablet form of the detergent ingredients retainably held by the second receptacle-shaped container 47, is illustrated at 103 in FIG. 9. It is to be understood that, in the event that a chlorine-releasing and/or defoamer plug or plugs were inserted in cast detergent 100, container 47 could be left empty.

In the embodiment of the detergent dispenser disclosed in FIGS. 6–9, the height and width of the cartridge member 40) are sized for cooperative insertion within the access port 32 of the housing 21, as illustrated in FIG. 6, whereby cartridge member 40 can be placed in a fixed pre-determined position with respect to the housing, (as indicated in FIG. 9). When disposed in such fixed, pre-determined resting position, upper detergent surface 100a (the only surface of cast solid detergent 100 which is not surrounded by the walls of cartridge member 40) is exposed to any spray which may emerge from spray-forming nozzle 61. Referring to FIGS. 9 and 6, a conduit member 60 is secured to the upper wall 21f of the housing 21 and projects therethrough into the upper spray region 30a of the inner cavity 30. The spray-forming nozzle 61 is threaded or otherwise properly secured to that end of the conduit 60 extending into the inner cavity 30 and is disposed therein, so as to project a spray pattern of pre-determined shape at substanially the entire respective exposed solid detergent block surfaces of the detergent within the various receptacle chambers of the cartridge member 40. The nozzle 61 is oriented, relative to the "fixed" position of the cartridge member 40 within the inner cavity 30, such that the longitudinal spray axis 62 from the nozzle is disposed generally perpendicular to the broad "drainable" exposed upper surface 100a of the solid block detergent volume 100. The spray nozzle may be of any suitable configuration and construction for projecting a pressurized spray of aqueous liquid (preferably water) received through the conduit 60, in a pre-determined pattern, configured to directly impinge upon substantially the entire exposed surfaces of the solid block detergent retainably held by the cartridge member 40. In that embodiment of the invention disclosed in the Figures, the particular spray nozzle produces a "square" spray pattern (as viewed in a plane generally perpendicular to the longitudinal spray axis 62) for directing the spray pattern ejected therefrom at substantially the entire drainable exposed surface 100a as well as at the exposed surface or surfaces of the solid block detergent retainably held by the second receptable-shaped container 47. The water supply conduit 60 passes through a siphon breaker 63 (FIG. 6) and is connected, in operation, to a suitable pressurized source of water (not shown), generally ranging between 5 and 70 psi.

A safety switch configuration is mounted within the housing 21 for sensing the operative position of the cartridge member 40 within the inner cavity 30, including a reed switch member 70, mounted in a fixed position by means of a mounting bracket 71 (see FIG. 9). Side wall portion 44a of the cartridge 40 contains an encapsulated magnet 72 (FIGS. 7 and 9). The positions of magnet 72 and the reed switch 70 are such that the reed switch 70 is activated by the magnetic flux of the magnet 72 only when the cartridge member 40 has been fully accepted into the inner cavity 30 of the dispenser 21 in its pre-determined fixed position (as illustrated in FIG. 9), whereby the access port 32 of the housing 21 is substantially closed by the positioned cartridge member 40. As the magnet 72 is withdrawn out of activating proximity with the reed switch 70, the reed switch changes its energization state, providing an appropriate energizing (or de-energizing) signal to a valve (not shown) to block pressurized fluid flow through the conduit 60 to the nozzle 61.

Once the cartridge member 40 is properly inserted at its fixed pre-determined position within the inner cavity 30, the masses or volumes of cast detergent or detergent ingredients retainably held by one or more of the various receptacles within the cartridge 40 are dissolved at a pre-determined rate, by the pressurized impinging flow of aqueous liquid from the nozzle 61. A pressurized source of water is provided to the nozzle 61 as commanded by appropriate control means within the washing machine proper which the detergent dispenser services. For example, for a "demand" system, an electronic control network such as described in the previously cited U.S. Pat. No. 3,680,070 to Nystuen could be used to selectively provide pressurized water to the nozzle 61. Control over the duration of the impinging flow controls the amount of detergent dispensed from surface 100a and ultimately the concentration of detergent in the wash tank of the washing machine (not shown).

Once pressurized fluid flow is applied to the nozzle 61, the nozzle generates a pressurized spray pattern of pre-determined configuration, which is uniformly directed across substantially the entire upper exposed surface 100a of the solid detergent block 100, as well as against any exposed surfaces of the solid detergent ingredients 102 or 103 contained within the second receptacle-shaped container 47. The spray pattern passes through the mesh of the screen member 50 and impinges directly upon the exposed surfaces of the retainably held solid detergent blocks, dissolving by means of the hydraulic action of the spray itself, a portion of the solid detergent blocks, at their respective exposed surfaces. After striking the exposed surface 100a of the detergent block 100, the spray (now converted into an aqueous liquid detergent), drains or flows by gravity down the exposed surface 100a, dissolving by errosive action, further detergent at the exposed upper surface 100a. (The inclination from the horizontal of surface 100a facilitates gravity flow.) Upon reaching the interconnecting wall portion 50c of the screen member 50, the concentrated aqueous liquid detergent cascades over and through the solid chlorine source or defoamer pellets or tablets 103 held within the second receptacle-shaped container 47, to release a predetermined proportionate amount of chlorine or defoamer components therefrom—all of which passes (or drains) in solution as concentrated detergent solution to the lower collector or discharge aqueous liquid detergent solution does not accumulate in region 30b but passes by gravity through the discharge port 34 (FIG. 8) within hose clamp extension 35 (FIGS. 8 and 9) into appropriate conduit means or directly into an underlying wash tank or ware-washing zone. Besides the errosive action of solution passing from the upper exposed surface 100a of the detergent mass 100, the volume of solid ingredients within the second [receptable-shaped ] *receptacle-shaped* container 47 is further directly dissolved by hydraulic action from the spray projected from the nozzle 61.

This invention applies to dispenser configurations wherein the nozzle 61 is mounted below the exposed detergent surface, and the detergent surface is placed at an angle beyond 90° (i.e. rotated through 90° up to 180°, which would be an inverted position in which surface 100a faced downward). In the embodiment of FIGS. 6–9, it is generally preferable to position the nozzle 61 in a position overlying the solid detergent block to be dissolved, and to place the exposed surface or surfaces of the solid block detergent at an angle with respect to the hozizontal (preferably between 10° and 90°), to supplement the hydraulic dissolution with the errosive dissolution caused by the solution flowing down the exposed surface(s). In a preferred embodiment of the invention disclosed in the Figures, it has been found that as inclination of the exposed detergent surface 100a of approximately 60° with the horizontal provides adequate dwell time for the downwardly flowing water, while maintaining a sufficiently small response time for the dispenser (i.e. that elapsed time after which the pressurized spray is projected from the nozzle 61 to the time in which the majority of the concentrated detergent solution produced thereby has drained downwardly from the discharge port 34).

The first lower wall 21c of the dispenser 21, as well as the upper and lower peripheral side wall portions 44a and 42a of the cartridge member 40 are inclined slightly with respect to the horizontal (when the dispenser and enclosed cartridge member 40 are mounted in operative position), to insure drainage of any liquid solution (either the projected spray or resultant concentrated solution) therefrom. Any liquid coming in contact with these surfaces is directed toward the collector region 30b of the cavity 30.

Thus, the formation of an aqueous liquid detergent due to the flow of liquid over surface 100a and/or pellets 103 is generally simultaneous with the resulting downward or gravity flow, which quickly reaches extension 35 and prevents standing water build-up. Whenever the charge of solid detergent contained within the various receptacles of the cartridge member 40 are depleted, the cartridge is rapidly replaced by slidably removing the spent cartridge from the inner cavity 30, through the access port 32, and simply replacing the spent cartridge with a fully charged cartridge member 40. As previously discussed, the disposable cartridge could be physically re-charged before replacement thereof into the housing 21. In such a re-usable cartridge application, it would be desirable to wrap the highly caustic detergent block being placed within the cartridge with a water soluble covering such as polyvinylalcohol to protect the hands of the person handling the solid detergent block used to charge the cartridge. Alternatively, the cartridge member 40 could be replaced by an appropriate retaining means forming an integral part of the housing 21 and having appropriate receptacle retaining means for retainably holding charges of solid block detergent in the required pre-determined position with respect to the nozzle spray pattern.

METHOD OF MANUFACTURING

Cast Detergent

While the following process is described with reference to specific components, it should be understood that other components and similar processes can be used to form a detergent solution which can be cast into a mold and will solidify upon hydration of its hydratable component. A particularly useful detergent composition of this invention is formed by heating about 20–75 parts by weight of a 40–75 weight percent aqueous solution of an alkali metal hydroxide, e.g. sodium hydroxide, to a temperature above about 55° C., preferably 65°–85° C. Temperatures approaching 95° C. can also be used; see Examples 9 and 9A which follow. Which other alkali metal hydroxides may be used, sodium hydroxide has been found to be particularly useful and the following method of manufacturing will be described with respect to it. Aqueous solutions of 50 weight percent sodium hydroxide are readily commercially available. Solutions containing higher weight percents of sodium hydroxide are also available (e.g. 73%) or can be produced by adding a desired amount of anhydrous sodium hydroxide to a 50 weight percent solution of sodium hydroxide. An aqueous solution of sodium hydroxide can also be prepared by mixing water and anhydrous sodium hydroxide in the desired ratio.

After the aqueous solution of sodium hydroxide reaches a temperature above 55° C., preferably above 65° C., anhydrous sodium hydroxide can be added, as illustrated in several of the Examples which follow, the prefered amount being about 8 to about 40 parts by weight, i.e. about 8 to about 40% of the weight of the total cast detergent composition. A lower temperature range (e.g. 55°–70° C.) may also be used in the process, e.g. during alkali metal condensed polyphosphate addition. Typically, about 15 to about 40 parts by weight of anhydrous alkali metal condensed polyphosphate are added to the solution. It is not necessary to completely dissolve the alkali metal condensed polyphosphate, since it can be suspended in the composition. After the polyphosphate and/or optional fillers or components (the polyphosphate is a preferred ingredient), are added, the mixture can be cooled. Continuous mixing can be used during any dissolving. Cooling, and thickening steps. The cooled and thickened mixture is poured into a receptacle-shaped mold to a level at least part way up the side molding surfaces. As the mixture continues to cool it will solidify to form a cast composition. Solidification is believed to be substantially due to to cooling. (This invention is not bound by any theory, however.) After is has solidified, the cast detergent is surrounded by and in contact with the mold on all sides except for its upper surface which remains exposed.

After the base detergent has been poured into the mold, but before it has solidified, preformed cores or plugs such as plug 6 in FIGS. 2 and 3 may be added. When a plug is added, the base detergent is allowed to solidify around it and retain it in place. While any shape or size plug could be used, it is normally preferred that the plug extend to the entire depth of the base detergent as illustrated in FIG. 2. The plug should extend the depth of the solidified detergent so that a constant ratio of components can be maintained while the base detergent and the plug are disolved during use.

An alternative method of including a separately formed plug or plugs could consist of using a mold comprising one or more smaller molds positioned within the larger mold. The large mold would be filled with the cast detergent base while the smaller mold or molds would contain separate compositions such as a source of available chlorine or a defoamer. The compositions could be cast into the smaller mold or preformed as a plug and "pressed" into the mold. The present invention will be further understood by reference to the following specific Examples which are illustrative of the composition, form and method of producing the solid, cast detergent-containing article of this invention. It is to be understood that many variations of composition, form and method of producing the cast detergent would be apparent to those skilled in the art. The following Examples, wherein parts and percentages are by weight unless otherwise indicated, are only illustrative.

EXAMPLE 1

An 8.8 pound batch (approximately 4000 grams) of a solid cast detergent of this invention was prepared using the following procedure.

Fifty-five parts by weight of a 50 weight percent aqueous solution of sodium hydroxide were added to a laboratory mixer provided with a stirring means and a heating means. The 50% sodium hydroxide solution was heated to approximately 55°–60° C. Nine parts by weight of anhydrous sodium hydroxide were added to the solution. The solution was stirred until the anhydrous sodium hydroxide was completely dissolved. The addition of the anhydrous sodium hydroxide had the effect of forming an approximate 57 weight percent aqueous solution of sodium hydroxide.

Thirty-six parts of anhydrous sodium tripolyphosphate were added to the solution and the solution was mixed. The tripolyphosphate did not completely dissolve but was held in suspension by mixing. Mixing was continued without heating until the solution began to thicken, which was approximately 10–15 minutes after the addition of the tripolyphosphate.

After the mixture had thickened but while it was still pourable, six pounds (about 2700 grams) were poured into a receptacle-shaped mold such as mold 3 in FIGS. 1–3, consisting of a slightly tapered cylindrical plastic container measuring about 6½ inches (about 16.5 cm) at the major diameter (the open end) and about 5½ inches (about 14 cm) at the minor diameter and about 4½ inches (about 11.5 cm) in depth. The mixture was allowed to harden in the mold which took approximately 5 minutes.

The composition of the final cast product (in weight-%) was approximately:

| | |
|---|---|
| 36.5% | sodium hydroxide |
| 27.5% | water |
| 36.0% | sodium tripolyphosphate |
| 100.0% | |

While this product can be used as a detergent without additional additives, additional components can be included as illustrated in the following Examples.

EXAMPLE 2

A product with the same composition as that described in Example 1, with the exception that 1 part by weight of the 50% sodium hydroxide was replaced with 1 part by weight of a defoamer, was produced. The defoamer was added following the addition of the sodium tripolyphosphate and was kept uniformly dispersed by continuous mixing until the mixture was poured in the mold. At the time it was poured the mixture was sufficiently viscous so that a uniform dispersion was maintained.

The composition of the final cast product (in weight-%) was approximately:

| | |
|---|---|
| 36% | sodium hydroxide |
| 27% | water |
| 36% | sodium tripolyphosphate |
| 1% | defoamer |
| 100% | |

EXAMPLE 3

A mixture was prepared according to the procedure described in Example 1. 53.57 parts of 50% sodium hydroxide, 8.77 parts of anhydrous sodium hydroxide, and 35.06 parts of anhydrous sodium tripolyphosphate were used. The mixture was then poured into the mold described in Example 1. Before the mixture completely solidified 2–6 parts of a preformed circular "plug" measuring about 1 inch in diameter (about 2.5 cm) and about 3½ (about 9 cm) in length, comprising a source of available chlorine, was placed approximately in the center of the mold. The length of the plug was such that it extended from the bottom of the mold to the surface of the mixture. The mixture was then allowed to harden around the plug.

Th composition of the solidified cast detergent (in weight-%) was:

| | |
|---|---|
| 35.5% | sodium hydroxide |
| 26.8% | water |
| 36.1% | sodium tripolyphosphate |

-continued

| | |
|---|---|
| 2.6% | chlorine plug |
| 100.0% | |

The available chlorine containing plug was prepared by forming a composition consisting of:

| | |
|---|---|
| 59.7 | parts calcium hypochlorite - 65% available chlorine (HTH TM from Olin-Mathieson) |
| 14.4 | parts Veegum ® WG (from R. T. Vanderbitt Company, Inc.) |
| 25.9 | parts dendritic sodium chloride |
| 100.00 | |

"Veegum" is a trademark for inorganic suspending agents.

After the three ingredients were mixed, plugs measuring about 1 inch (about 1 inch (about 2.5 cm) in diameter and about 3½ inches (about 9 cm) in length, were made by filling an appropriate size cylindrical die with the composition and subjecting the die to about 2,000 psi in a hydraulic press.

Plugs containing available chlorine were produced following the same procedure from the two following compositions:

| | | |
|---|---|---|
| A. | 100 | parts Lithium Hypochlorite 35% available chlorine |
| B. | 51.4 | parts sodium dichloroisocyanurate dihydrate |
| | 14.4 | parts Veegum ® WG |
| | 34.2 | parts dendritic sodium chloride |
| | 100.0 | parts total |

Plugs produced from the these formulas were also found to perform satisfactorily in the article of this invention.

EXAMPLE 4

This Example was designed to illustrate how plug 6 of FIGS. 2 and 3 could be further isolated from the base detergent. One plug was made from each of the following formulas by compression molding at about 2000 psi mold pressure.

| | | |
|---|---|---|
| 41.0 g | (59.9%) | calcium hypochlorite - 65% available chlorine |
| 10.0 g | (14.3%) | Veegum ® WG |
| 18.0 g | (25.8%) | dendritic salt |
| 69.9 g | (100%) | |
| 41.5 g | (59.7%) | sodium dichloroisocyanurate dihydrate |
| 10.0 g | (14.4%) | Veegum ® WG |
| 18.0 g | (25.9%) | dendritic salt |
| 69.5 g | (100%) | |

Both plugs were dipped in melted paraffin wax which was held at just about its melting point of 56.5° C. so that a very thin coating of paraffin wax was formed on the sides and one end of the plug. The wax allowed to cool and harden. The plugs were then inserted into the cast detergent base of Example 2 following the procedure of Example 3. No visual indication of any reaction at the plug-detergent base interface was noted with either of these plugs.

EXAMPLE 5

A mixture was prepared following the procedure described in Example 2. 52.57 parts of 50% sodium hydoxide, 8.77 parts of anhydrous sodium hydroxide, 35.06 parts of anhydrous sodium tripolyphosphate and 1 part defoamer were used. The mixture was then poured into the mold described in Example 1. Before the mixture completely solidified, 2.6 parts of a chlorine containing plug similar to those described in Example 3 was added as described in Example 3.

The composition of the solidified cast detergent was:

| | |
|---|---|
| 35.0% | sodium hydroxide |
| 26.3% | water |
| 35.1% | sodium tripolyphosphate |
| 1.0% | defoamer |
| 2.6% | chlorine plug |
| 100.0% | |

EXAMPLE 6

A solid cast detergent of the same formula as that described in Example 5 was produced. However, instead of mixing the defoamer with the base detergent is was added in the form of a plug. Thus, two plugs were used, one comprising a defoamer and the other comprising a source of available chlorine. The two plugs were placed near the center of the mold after the detergent was added, but before it solidified.

The composition of the solidified cast detergent was:

| | |
|---|---|
| 35.0% | sodium hydroxide |
| 26.3% | water |
| 35.1% | sodium tripolyphosphate |
| 1.0% | defoamer plug |
| 2.6% | chlorine plug |
| 100.0% | |

The defoamer plug was prepared by heating together 60 parts of a viscous (at room temperature) polyoxyalkylene glycol and 40 parts of a solid mixture of mono- and di-alkyl phosphate esters until the phosphate esters melted and then mixing until the mixture was uniform. The solution was then poured into a cylindrical mold and allowed to cool and form a solid plug at room temperature.

Similar plugs were produced following essentially the same procedure using: 50 parts of a polyethylene glycol, 25 parts of a polyoxyalkylene glycol, and 25 parts of a mixture of mono- and di-alkyl phosphate esters.

EXAMPLE 7

A solid cast detergent was produced using the same formula and procedure as described in Example 2 except that the 1 part of defoamer was added as a plug similar to those described in Example 6.

EXAMPLE 8

Approximately 6 pounds of a solid cast detergent of the invention were prepared using the following procedure. 40 parts of anhydrous sodium metasilicate and 39 parts of a 10 weight percent aqueous solution of sodium hypochlorite were added to a laboratory mixer provided with a stirring means and a heating means. The solution was heated to approximately 55°-60° C. Twenty parts of anhydrous sodium tripolyphosphate were added to the solution and the solution mixed without heating until it began to thicken. After the mixture had thickened but while it was still pourable it was poured into a mold consisting of the dimensions described in Example 1. Before the mixture completely solidified, 1 part of a defoamer plug similar to those described in Example 6 was added following the previously described procedure.

The composition of the solidified cast detergent was approximately:

| | |
|---|---|
| 40% | sodium metasilicate |
| 35% | water |
| 20% | sodium tripolyphosphate |
| 4% | sodium hypochlorite |
| 1% | defoamer plug |
| 100% | |

EXAMPLE 9

This Example was designed to illustrate that the sodium tripolyphosphate component of the previous Examples can be formed in-situ by reating sodium trimetaphosphate with sodium hydroxide via the following reaction:

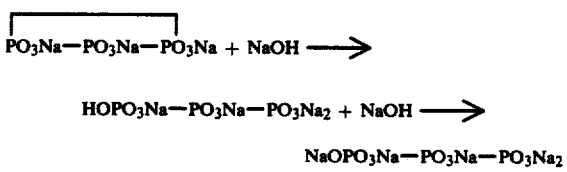

Approximately 2200 ml of 50% aqueous sodium hydroxide was added to a stainless steel, jacketed beaker equipped with a "Lightning" stirrer. Following the addition the temperature was 70° F. (21° C). Next 1440 g of powdered trimetaphosphate was added slowly. As the temperature of the mixture approached 100° F. (38° C.), cooling was applied. The remainder of the trimetaphosphate was added incrementally until the entire 1440 grams has been added. During the addition a maximum temperature pf 200° F. (93° C.) was reached.

Upon sitting for several minutes the mixture formed a solid which could have been cast into a mold and used as the solid, cast detergent of this invention.

EXAMPLE 9A

This Example illustrates that chlorinated trisodium phosphate may be used as the chlorine source. A solid cast detergent having the following composition was prepared:

| | |
|---|---|
| 36.0% | caustic soda |
| 27.0% | water |
| 36.0% | sodium tripolyphosphate |
| 1.0% | defoamer |
| 100.0% | |

The above mixture was prepared using the procedure as described for Example 2. The mixture was poured (about 2360 g) into the mold which has a removable 2 inch diameter cylinder placed in the center. After the mixture had solidified, the 2 inch diameter cylinder was removed leaving a hollow cylindrical cavity. This hollow cavity was filled with about 340 grams of molten chlorinated trisodium phosphate. The chlorinated trisodium phosphate solidified upon cooling below its melting point. Some reaction occurred at the interface of the plug. It is believed that this reaction may be reduced significantly allowing the cast detergent to cool thoroughly before the chlorinated trisodium phosphate was poured and/or coating the cavity surface with an inert barrier such as, for example, paraffin wax or mixed mono and dialkyl esters of polyphosphoric acid or like materials.

EXAMPLE 10

This Example was designed to illustrate the production of a non-phosphate solid, cast detergent. Forty parts of 50% aqueous sodium hydroxide was heated to 150° F. (65.5° C.) in a jacketed stainless steel beaker equipped with a stirrer. Twenty parts of anhydrous sodium hydroxide were added and the mixture was stirred until a molten solution was formed. Twenty-five parts of liquid silicate (RU silicate from Philadelphia Quartz) having an $SiO_2/Na_2O$ ratio of 2.54 was added and resulted in the temperature of the mixture increasing to about 200° F. (93° C.). The mixture was cooled to about 150° F. (65° C.) and 15 parts of sodium polyacrylate were added slowly while stirring continued.

The mixture was poured into a plastic container where it solidified upon cooling.

EXAMPLE 11

The purpose of this Example is to compare the consistency of available chlorine recovery from a cast detergent-containing article produced according to the instant invention and a conventional, prior art, powdered detergent. The prior art formula used consisted of a mixture of sodium tripolyphosphate, sodium dichloroisocyanurate (a chlorine source). Sodium metasilicate, and sodium hydroxide. Sodium dichloroisocyanurate comprised approximately 2.8% of the formula. The cast detergent-containing article used was produced by the process and using the formula described in Example 5. The chlorine source was present in the form of a plug situated approximately in the center of the cast base detergent. The cast detergent containing article was dispensed from an apparatus similar to the one illustrated in FIG. 4. The prior art formula was dispensed from a water-in-reservoir dispenser of the type illustrated in FIG. 1 of U.S. Pat. No. 3,680,070, issued July 25, 1972 (Nystuen).

Samples of the effluent from the dispensers were collected periodically and titrated for alkalinity to the phenolphthalein end point with hydrochloric acid and titrated for available chlorine with sodium thiosulfate using the conventional iodometric titration. The influent water temperature to both dispensers was about 71° C. (160° F.).

The amount of detergent present in the effluent was determined by the alkalinity of the effluent. The "Chlorine recovered-percent of theoretical" (CRPT) was then calculated from the formula:

$$CRPT = \frac{\text{available chlorine in effluent}}{\text{available chlorine expected in effluent (from detergent present)}} \times 100$$

Figure 5:
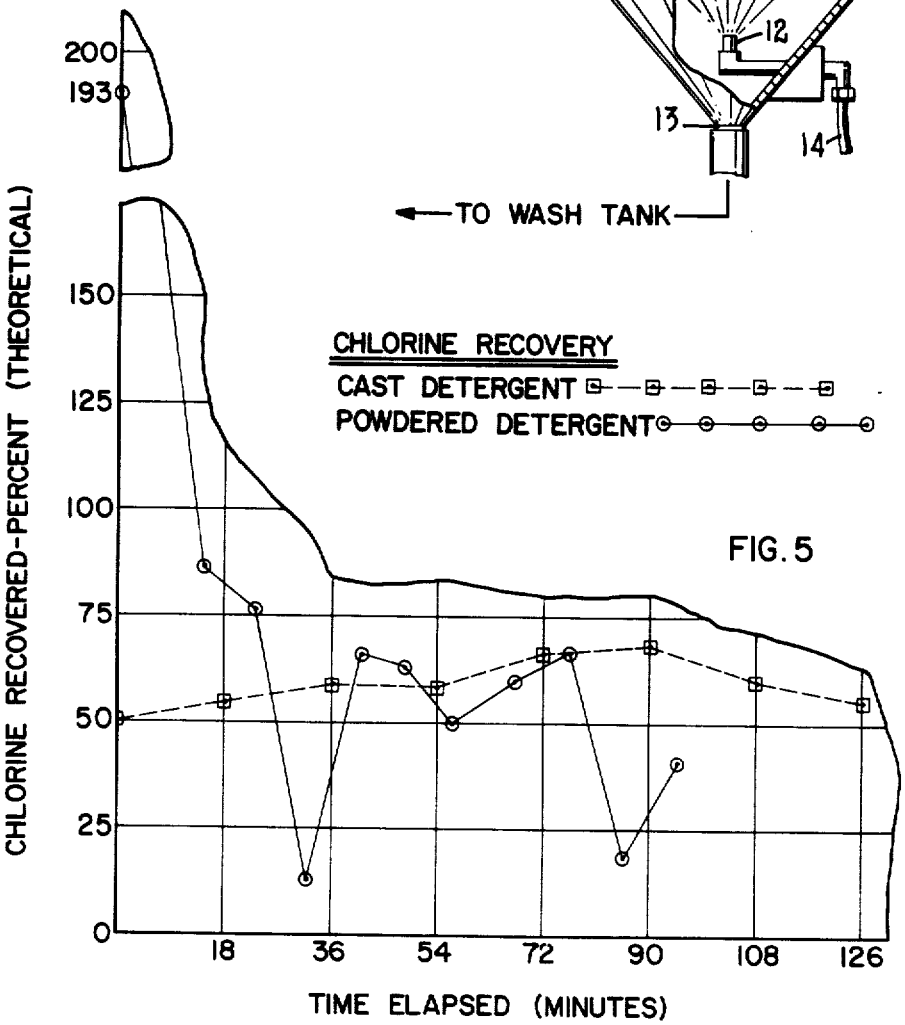
FIG. 5 is a graph comparing the chlorine recovery for a cast detergent prepared according to this invention versus a conventional powdered detergent.

The results are illustrated in FIG. 5. FIG. 5 shows that the solid cast detergent of this invention provides very uniform chlorine recovery when compared to a prior art formulation. It is theorized that the differential solubility of the components of the prior art powdered detergent is responsible for the more erratic chlorine recovery shown by the prior art detergent.

EXAMPLE 12

This Example was designed to determine the effect of segregation during the manufacture of a conventional, prior art, powdered detergent. Since there should be no segregation with the solid cast detergent of this invention, (since all the components are physically locked in place) any significant segregation with a powdered detergent would represent a disadvantage of the powdered detergent.

The conventional powdered detergent used was the same as that described in Example 11. This powdered detergent is commonly packaged in two-pound packages. Seven two-pound packages from the same production batch were selected at random for analysis. Ideally each of the packages should contain the same percentage of each of the four ingredients.

The contents of each of the packages were weighed and the entire contents dissolved in an appropriate quantity of water in a 30 gallon drum to give a 1% weight/volume solution. This eliminated any variation due to the possibility of different amounts of detergent being present in different packages. A 100 ml sample was withdrawn from each drum and titrated for available chlorine with sodium thiosulfate using the standard iodometric titration. The results were as follows:

| Sample No. | Percent Available Chlorine |
|---|---|
| 1 | 1.63 |
| 2 | 2.00 |
| 3 | 1.53 |
| 4 | 1.56 |
| 5 | 1.54 |
| 6 | 1.96 |
| 7 | 1.65 |

As indicated, the percentage of available chlorine varied from 1.53 to 2.00. This variation is in part due to segregation during mixing and packaging of the powdered detergent. This segregation is probably one factor leading to the variation in chlorine delivery illustrated in FIG. 5.

EXAMPLE 13

This Example was designed to compare the chlorine stability of cast detergents of this invention containing a chlorine source directly in the base detergent with cast detergents of this invention which incorporate a chlorine source as a core or plug, such as those described in Exampe 3. Three different chlorine sources were used: sodium dichloroisocyanurate dihydrate (NaDCC2-$H_2O$), lithium hypochlorite (LiOCl), and calcium hypochlorite ($Ca[OCl]_2$). All of the compositions were produced following the procedure of Example 1 with the chlorine source being added directly to the mixture following the addition of the sodium tripolyphosphate in one case and the chlorine being added as a plug in the other. In the third case the chlorine source plug was dipped in a paraffin wax (m.p. 52.5° F.) and in a fourth case the chlorine source plug was dipped in mono and dialkyl ester of polyphosphoric acid, a wax-like solid (m.p. 150°-160° F.). The formula used and the available chlorine remaining after various storage times at room temperature are shown in Table I.

As indicated by Table I, when the chlorine source is added directly as a component of the cast detergent most of the chlorine is lost within 24 hours. [However, when the chlorine source is added directly as a component of the cast detergent most of the chlorine is lost within 24 hours.] However, when the chlorine source is incorporated into the cast detergent as a preformed core or plug, excellent chlorine stability results with $Ca(OCl)_2$ and lithium hypochlorite but not with $NaDCC2H_2O$. When the chlorine source plug was coated with a film of paraffin wax or a waxy mono and dialkyl ester of polyphosphoric acid the best stabilities were obtained.

TABLE I

| | CHLORINE STABILITY | | | | | |
|---|---|---|---|---|---|---|
| Components* | $Ca(OCl)_2$ | LiOCl | NaDCC—$2H_2O$ | $Ca(OCl)_2$ | LiOCl | NaDCC—$2H_2O$ |
| | CHLORINE SOURCE ADDED DIRECTLY TO DETERGENT | | | CHLORINE SOURCE ADDED AS PLUG | | |
| NaOH - 50% | 52.4 | 51.0 | 52.2 | 52.57 | 52.57 | 52.57 |
| NaOH Anhyd | 9.0 | 9.0 | 9.0 | 8.77 | 8.77 | 8.77 |
| STP | 36.0 | 36.0 | 36.0 | 35.06 | 35.06 | 35.06 |
| Defoamer | 1.0 | 1.0 | 1.0 | 1.00 | 1.00 | 1.00 |
| $Ca(OCl)_2$ | 1.6 | — | — | 2.60 | — | — |
| NaDCC—$2H_2O$ | — | — | 1.8 | — | — | 2.60 |
| Li(OCl) - 35% | — | 3.0 | — | — | 3.33 | — |
| Percent Available Chlorine remaining after 24 hours | 3.5 | 17.4 | 3.5 | — | — | — |
| Percent Available Chlorine remaining after 2 days | — | — | — | — | — | — |
| Percent Available Chlorine remaining after 15 days | — | — | — | — | 60 | 1.5 |
| Percent Available Chlorine remaining after 29 days | — | — | — | 98 | — | — |
| | CHLORINE SOURCE ADDED AS PLUG BUT COATED WITH PARAFFIN | | | CHLORINE SOURCE ADDED AS PLUG BUT COATED WITH PE-053 | | |
| NaOH - 50% | 52.57 | 52.57 | 52.57 | 52.57 | 52.57 | 52.57 |
| NaOH Anhyd | 8.77 | 8.77 | 8.77 | 8.77 | 8.77 | 8.77 |

TABLE I-continued

| Components* | CHLORINE STABILITY | | | | | |
|---|---|---|---|---|---|---|
| | $Ca(OCl)_2$ | LiOCl | $NaDCC—2H_2O$ | $Ca(OCl)_2$ | LiOCl | $NaDCC—2H_2O$ |
| STP | 35.06 | 35.06 | 35.06 | 35.06 | 35.06 | 35.06 |
| Defoamer | 1.00 | 1.00 | 1.00 | 1.00 | 1.00 | 1.00 |
| $CA(OCl)_2$ | 2.60 | — | — | 2.60 | — | — |
| $NaDCC—2H_2O$ | — | — | 2.60 | — | — | 2.60 |
| Li(OCl) - 35% | — | 3.33 | — | — | 3.33 | — |
| Percent Available Chlorine remaining after 24 hours | — | — | — | — | — | — |
| Percent Available Chlorine remaining after 29 days | — | — | — | — | — | — |
| Percent Available Chlorine remaining after 15 days | 100 | 99 | 100 | — | — | — |
| Percent Available Chlorine remianing after 2 days | — | — | — | 100 | 99 | 100 |

*Components shown in parts by weight. These products essentially same as Product of Example 5.

EXAMPLE 14

The purpose of this Example was to compare the uniformity of delivery of defoamer from: (A) a conventional powdered detergent (Score TM, a commerical product of Economics Laboratory, Inc.); (B) a cast detergent (product of Example 5); and (C) a cast detergent incorporating the defoamer as a core or plug (product of Example 6). All three of the formulations contained 1% by weight of defoamer. The (A) conventional detergent and (B) the product of Example 5 contained the same defoamer; (C) the product of Example 6 contained the blend of two defoamers described in Example 6 (the blend was used to obtain a solid product which could be molded into a plug).

All tests were conducted in a Hobart C-44 (trademark) single tank dishwashing machine. A C-11 Dispenser (trademark of Economics Laboratory, Inc.), a water-in-reservoir type dispenser, was used to dispense product (A) (the conventional powdered detergent). The Hobart C-44 (trademark) machine was equipped with a dispenser simular to that illustrated in FIG. 4 for dispensing the solid cast detergent products (B) (product of Example 5) and (C) (product of Example 6). Both dispensers were contolled by a conductivity base controller of the type described in U.S. Pat. No. 3,680,070, issued July 25, 1972 (Nystuen). The controller was set to maintain a 0.2% concentration of detergent in the wash tank. The water temperature was about 140° F. (65° C.) for all of the tests.

Defoamers are included in detergents for spray-wash machines to control foam created by food soils. Foam in a wash tank leads to entrapment of air in the wash solution being recirculated through the machine and results in a reduction in mass and kinetic energy which leads to poor soil removal. Excess foam in a wash tank causes a loss in water pressure which can be measured by a manometer connected to the wash manifold upstream from the water pump. Egg is a common foam-causing food soil and was selected for use in this test.

The C-11 Dispenser optimally holds about four pounds of powdered detergent and thus four pounds of conventional detergent (A) were used in the test. Products (B) and (C) were approximately six pounds each and were of the configuration described in Example 1 and illustrated in FIGS. 1-4.

The pressure (in inches of water) was recorded when the dispenser was freshly charged, when about one-half of the detergent had been dispensed, and when about four-fifths of the detergent had been dispensed. Manometer readings were taken on the freshly charged detergent: (1) with water alone, (2) after the detergent was added, (3) five minutes after 115 grams of egg were added, and (4) five minutes after an additional 100 grams of egg were added.

Between the "Freshly Charged" test and the "Detergent ½ Spent" test, the fill valve was opened to deliver 2 gallons of water per minute for dilution to simulate normal dilution of the wash tank by rinse water which is diverted to the wash tank to freshen the wash water. The conductivity controller dispensed detergent as required to maintain a 0.2% concentration of detergent in the wash tank. When about one-half of the detergent originally in the dispensers was left, manometer readings were taken and the two egg additions described above repeataed with readings being taken five minutes after each addition. The same procedure was repeated after about one-fifth of the detergent originally present was left in the dispensers (four-fifths spent).

The "Detergent ½ Spent" test was somewhat more severe than the "Freshly Charged" test and, likewise, the "Detergent 4/5 Spent" test was somewhat more severe than the "Detergent ½ Spent" test, due to the cumulative concentration of egg soil resulting because the wash tank was not drained between tests.

The results of these tests are summarized in Table II.

TABLE II

| | FRESHLY CHARGED | | DETERGENT ½ SPENT | | DETERGENT 4/5 SPENT | |
|---|---|---|---|---|---|---|
| | Wash Pressure (inches of water) | % Loss | Wash Pressure (inches of water) | % Loss | Wash Pressure (inches of water) | % Loss |
| (A) Conventional Powdered Detergent | | | | | | |
| Water alone: | 43 | — | — | — | — | — |
| Detergent added: | 43 | — | 42.5 | — | 41.0 | 5.0 |
| 5 minutes after 115 g. | 38 | 12 | 26.0 | 40 | 25.0 | 42 |

TABLE II-continued

| | FRESHLY CHARGED | | DETERGENT ½ SPENT | | DETERGENT 4/5 SPENT | |
|---|---|---|---|---|---|---|
| | Wash Pressure (inches of water) | % Loss | Wash Pressure (inches of water) | % Loss | Wash Pressure (inches of water) | % Loss |
| egg added: | | | | | | |
| 5 minutes after additional 100 g. egg added: | 28 | 35 | 22.0 | 48 | * | — |
| (B) Defoamer in Cast Detergent (Product of Example 5) | | | | | | |
| Water added: | 42 | — | — | — | — | — |
| Detergent added: | 42 | — | 43 | — | 42.5 | — |
| 5 minutes after 115 g. egg added: | 42 | 0 | 43 | 0 | 41.0 | 3.0 |
| 5 minutes after additional: 100 g. egg added | 42 | 0 | 30 | 30 | 29.0 | 32 |
| (C) Defoamer as Plug in Cast Detergent (Product of Example 6) | | | | | | |
| Water alone: | 42.5 | — | — | — | — | — |
| Detergent added: | 42.5 | — | 42 | — | 42.5 | — |
| 5 minutes after 115 g. egg added: | 42.5 | 0 | 42 | 0 | 41.0 | 0 |
| 5 minutes after additional 100 g. egg added: | 42.5 | 0 | 42 | 0 | 41.0 | 3.5 |

*Test was stopped due to excessive foam to avoid damage to pump and motor.

The data in Table II indicates that Product (C) (the product of Example 6 with the defoamer included as a plug) had the highest and most consistent wash pressures and that Product (B) (the product of Example 5 with the defoamer included in the cast detergent) had higher and more consistent wash pressures than Product (A) (the conventional powdered detergent). The higher and more consistent wash pressures indicate more uniform defoamer delivery.

It was noted that the defoamer incorporated in the powdered detergent (A) floated to the top and formed an oily film in the water-in-reservoir dispenser. It is believed that this resulted in slug-feeding of the defoamer instead of uniform delivery. In contrast, with the solid cast detergent of this invention, both the detergent and defoamer are dispensed simultaneously which helps assure uniform dispensing of the defoamer.

What is claimed is:

1. A process for forming a three-dimensional, uniform solidi , casti, detergent *for ware and hard surface washing* within a receptacle-shaped mold which comprises:

(a) heating [about 20–75 parts by weight of a 40–75 weight percent] *an* aqueous solution of an alkali metal hydroxide [to about 55° to 95° C.];

(b) distributing an effective amount of a hardness sequestering agent and [about 15–40 parts by weight of an] *additional solid* alkaline hydratable chemical in said aqueous solution;

(c) thickening said solution, and mixing said solution during said thickening to form a castable uniform dispersion;

(d) pouring said uniform dispersion into said receptacle-shaped mold and at least partly filling said mold; and (e) allowing said thickened dispersion to solidify in said mold to a uniform, solid cast detergent wherein at least one surface of the cast detergent is exposed by the receptacle-shaped mold *and wherein the alkali metal hydroxide and the hardness sequestering agent are present in amounts sufficient to render the cast detergent solid at room temperature by virtue of water of hydration.*

2. The process of claim 1 wherein said alkali metal hydroxide is sodium hydroxide.

3. The process of claim 2 wherein said hardness sequestering agent is added to the aqueous solution maintained at a temperature of 55°–[70]*85*° C. and the hardness sequestering agent is sodium tripolyphosphate.

4. The process of claim 1 further comprising, following step (d) and prior to step (e), the step of inserting in said thickened solution in said mold at least one preformed plug composition.

5. The process of claim 4 wherein at least one preformed plug composition comprises a source of available chlorine.

6. The process of claim 1 wherein the *additional solid* alkaline hydratable chemical is selected from the group consisting of anhydrous sodium hydroxide, and combinations of sodium hydroxide and a sodium condensed phosphate.

7. The process of claim 6 wherein the said alkaline hydratable chemical is a combination of anhydrous sodium hydroxide and anhydrous sodium tripolyphosphate.

8. The process of claim 1 wherein the said hydratable material added is selected from the group consisting of sodium or potassium [trimetaphosphate] *tripolyphosphate.*

9. A solid, cast detergent-containing article produced by the process of claim 1 comprising:

(a) said solid cast detergent; and (b) the mold into which said solid cast detergent was cast, wherein said mold acts as a container for said cast detergent.

10. A process for forming a three-dimensional, uniform, solid, cast detergent *for ware and other hard surface washing* within a receptacle-shaped mold which comprises:

(a) heating [about 20–75 parts by weight of a 40–75 weight percent] *an* aqueous solution of an alkali metal hydroxide to about 55° C. to [95] *85*° C.;

(b) distributing an effective amount of a hardness sequestering agent and [about 15 to 40 parts by weight of an] *additional solid* alkaline hydratable chemical in said aqueous solution;

(c) thickening said solution with a polyelectrolyte polymer, to form a castable uniform dispersion;

(d) pouring said uniform dispersion into said receptacle-shaped mold and at least partly filling said mold; and (e) allowing the castable thickened dispersion to solidify in said mold to a uniform cast detergent, wherein at least one surface of the cast detergent is exposed by said mold *wherein the alkali metal hydroxide and the hardness sequestering agent are present in amounts sufficient to render the cast detergent solid at room temperature by virtue of water of hydration.*

11. The process of claim 10 wherein said alkali metal hydroxide is sodium hydroxide.

12. The process of claim [10] *11* wherein said hardness sequestering agent is added to the aqueous solution maintained at a temperature of 55°-[70]*85°* C. and said hardness sequestering agent is sodium tripolyphosphate.

[13. The process of claim 10 further comprising, following step (d) and prior to step (e), the step of inserting into the castable thickened solution in said mold at least one preformed plug composition.]

14. The process of claim 13 wherein at least one [of] preformed plug composition comprises a source of available chlorine.

15. The process of claim 10 wherein the said alkaline hydratable chemical is selected from the group consisting of anhydrous sodium hydroxide, and combinations of sodium hydroxide and a sodium condensed phosphate.

16. The process of claim 15 wherein the said alkaline hydratable chemical is a combination of an anhydrous sodium hydroxide and anhydrous sodium tripolyphosphate.

17. The process of claim 10 wherein the said hydratable material added is selected from the group consisting of sodium or potassium [trimetaphosphate] *tripolyphosphate.*

18. A solid, cast detergent-containing article produced by the process of claim 10 comprising:

(a) solid cast detergent; and (b) the mold wherein the mold acts as a container for said cast detergent.

19. A method of making an article of commerce incorporating a *warewashing* detergent composition which comprises:

(a) forming a castable liquid detergent composition at a temperature of up to [95] *85°* C. which comprises:

(1) at least 30% by weight of an alkaline hydratable chemical consisting essentially of alkali metal hydroxide;

(2) an effective amount of a hardness sequestering agent; and (3) [more than 15 parts by weight, per 100 parts by weight of said alkaline hydratable chemical, of] water of hydration, at least a portion of said water of hydration being associated with said alkali metal hydroxide *wherein the alkali metal hydroxide and the hardness sequestering agent are present in an amount sufficient to render the cast detergent a solid at room temperature by virtue of water of hydration;*

(b) cooling and agitating the liquid composition at a rate such that the liquid composition thickens without segregation of components forming a thickened liquid dispersion;

(c) pouring the thickened liquid dispersion into a receptacle-shaped mold; and (d) solidifying said liquid dispersion to form a uniform solid *warewashing* detergent composition.

20. The method of claim 19 wherein the mold in which the composition [was] *is* cast and solidified is a container for the detergent.

21. The method of claim 20 wherein the article further comprises a cover attached to the container.

22. The method of claim 19 wherein the article comprises at least one preformed core [surrounded by and in contact with the detergent on at least one side of the core].

23. The method of claim 22 wherein the preformed core comprises a material selected from the group consisting of a defoamer and a solid, available chlorine-containing component.

24. The method of claim 23 comprising a plurality of preformed cores, at least one of which comprises a solid, available chlorine-containing component.

25. The method of claim 23 wherein the preformed core has been coated with [an inert barrier] *a* film.

26. The method of claim [18] *19* wherein said castable liquid detergent composition comprises:

(a) at least about 30% by weight of an alkaline hydratable chemical consisting essentially of an alkali metal hydroxide;

(b) effective hardness-sequestering amount of an alkali metal condensed phosphate;

(c) [more than 5% by weight of] water of hydration in both discrete and continuous states of hydration, at least a portion of said water of hydration being associated with said alkali metal hydroxide;

(d) [up to 15% by weight of a] *an effective hardness sequestering amount of an organic* polyelectrolyte; and (e) up to 5% by weight of an additive selected from the group consisting of a defoamer and a solid, [avaliable] *available* chlorine-containing component.

27. The method of claim 18 wherein said castable liquid detergent composition further comprises a sodium silicate.

[28. A method for forming an article of commerce incorporating a uniform, cast detergent composition which comprises:

(a) forming a castable liquid detergent composition at a temperature of up to 95° C. which comprises:

(1) at least 30% by weight of an alkaline hydratable chemical consisting essentially of alkali metal hydroxide;

(2) an effective amount of a hardness-sequestering agent;

(3) an effective thickening amount of a polyacrylate; and (4) more than 15 parts by weight, per 100 parts by weight of said alkaline hydratable chemical of water of hydration, at least a portion of said water of hydration being associated with said alkali metal hydroxide;

(b) cooling the liquid composition to afford a thickened uniform dispersion; and (c) casting the uniform dispersion in a receptacle-shaped mold to yield a solid, uniform detergent composition.]

[29. The method of claim 26 wherein the mold in which the composition was cast and solidified is a container for the detergent.]

[30. The method of claim 29 wherein the article further comprises a cover attached to the container.]

[31. The method of claim 28 wherein the article comprises at least one preformed core surrounded by and in contact with the detergent on at least one side of the core.]

[32. The method of claim 31 wherein the preformed core comprises a material selected from the group consisting of a defoamer and a solid, available chlorine-containing component.]

[33. The method of claim 32 comprising a plurality of preformed cores, at least one of which comprises a solid, available chlorine-containing component.]

[34. The method of claim 33 wherein the preformed core has been coated with an inert barrier film.]

[35. The method of claim 28 wherein said castable liquid detergent composition comprises:

(a) at least about 30% by weight of an alkaline hydratable chemical consisting essentially of an alkali metal hydroxide;
(b) an effective hardness-sequestering amount of an alkali metal condensed phosphate;
(c) more than 5% by weight of water of hydration in both discrete and continuous states of hydration, at least a portion of said water of hydration being associated with said alkali metal hydroxide;
(d) up to about 15% by weight of a polyacrylate; and
(e) up to 5% by weight of an additive selected from the group consisting of a defoamer and a solid, available chlorine-containing component.]

[36. The method of claim 28 wherein said castable liquid detergent composition further comprises a sodium silicate.]

* * * * *

UNITED STATES PATENT AND TRADEMARK OFFICE

CERTIFICATE OF CORRECTION

PATENT NO. : Re. 32,763

DATED : October 11, 1988

INVENTOR(S) : Peter J. Fernholz, James L. Copeland, Richard C. Pentilla

It is certified that error appears in the above-identified patent and that said Letters Patent is hereby corrected as shown below:

In Item [75], for "Fernholtz" read --Fernholz--.

Column 3, line 58, for "is common" read --is a common--.

Column 4, line 18, for "The" read --This--.

Column 4, line 55, for "of" read --or--.

Column 5, line 50, for "isused" read --is used--.

Column 6, line 56, for "$M-PO_3M)_nOM$" read --$M\{PO_3M\}_nOM$--.

Column 7, line 60, for "$RO-PO_3M)_nR$" read --$RO\{PO_3M\}_nR$--.

Column 12, lines 66 and 67, for "polyethlene" read --polyethylene--.

Column 13, line 24, for "undelying" read --underlying--.

Column 13, line 53, for "40) are" read --40 are--.

Column 15, line 29, for "discharge aqueous" read --discharge region 30b of the dispenser 21. The concentrated aqueous--.

UNITED STATES PATENT AND TRADEMARK OFFICE

CERTIFICATE OF CORRECTION

PATENT NO. : Re. 32,763

DATED : October 11, 1988

INVENTOR(S) : Peter J. Fernholz, James L. Copeland, Richard C. Pentilla

It is certified that error appears in the above-identified patent and that said Letters Patent is hereby corrected as shown below:

Column 15, line 55, for "as" read --an--.

Column 16, line 1, for "solution" read --solutions--.

Column 16, lines 2 and 3, for "concentrated solution" read --concentrated detergent solution--.

Column 16, line 66, for "the" read --this--.

Column 17, line 8, for "dissolving. Cooling" read --dissolving, cooling--.

Column 17, line 13, for "due to to cooling" read --due to cooling--.

Column 17, line 14, for "is has" read --it has--.

Column 17, line 28, for "disolved" read --dissolved--.

Column 18, line 57, for "3 1/2 (about" read --3 1/2 inches (about--.

Column 19, line 20, for "1 inch (about 1 inch (about 2.5 cm)" read --1 inch (about 2.5 cm)--.

Column 19, line 38, for "from the these" read --from these--.

UNITED STATES PATENT AND TRADEMARK OFFICE

CERTIFICATE OF CORRECTION

PATENT NO. : Re. 32,763

DATED : October 11, 1988

INVENTOR(S) : Peter J. Fernholz, James L. Copeland, Richard C. Pentilla

It is certified that error appears in the above-identified patent and that said Letters Patent is hereby corrected as shown below:

Column 19, line 63, for "wax allowed" read --wax was allowed--.

Column 20, line 5, for "hydoxide" read --hydroxide--.

Column 20, line 26, for "is" read --it--.

Column 22, line 39, for "source). Sodium" read --source), sodium--.

Column 22, lines 61 and 62, for "Chlorine" read --chlorine--.

Column 25, line 19, under heading "Components" for "remianing" read --remaining--.

Column 25, line 45, for "contolled" read --controlled--.

Column 26, line 48, for "repeataed" read --repeated--.

Column 27, line 44, for "solidi, casti," read --solid, cast,--.

Signed and Sealed this

Sixteenth Day of May, 1989

*Attest:*

*Attesting Officer*

DONALD J. QUIGG

*Commissioner of Patents and Trademarks*